Oct. 30, 1945.  H. F. WOLSTENHOLME  2,387,964
ROTARY ENGINE
Filed Aug. 8, 1944  3 Sheets-Sheet 2

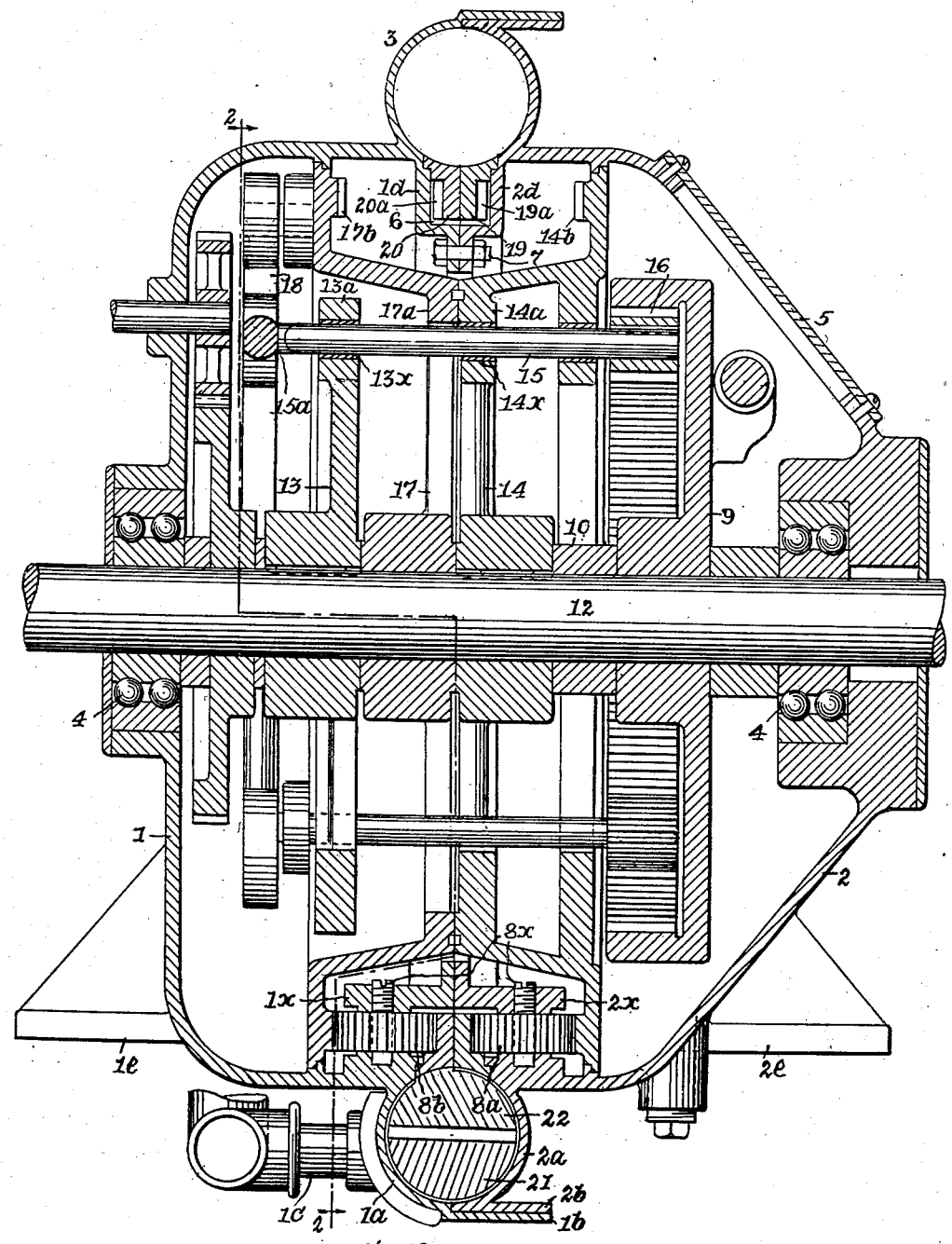

INVENTOR,
Harry F. Wolstenholme,
BY
John W. Leeward
ATTORNEY.

Patented Oct. 30, 1945

2,387,964

UNITED STATES PATENT OFFICE 2,387,964

ROTARY ENGINE

Harry F. Wolstenholme, Paterson, N. J.

Application August 8, 1944, Serial No. 548,605

4 Claims. (Cl. 121—49)

A known type of rotary fluid engine, by which I mean either one that acts to impel, or one driven by, a fluid (see, for instance, my Patents Nos. 1,795,750; 2,124,327; 2,142,706; 2,222,133; 2,284,186; and 2,352,877) includes two elements, one of which is rotary and one of which has a cylinder formed annular and with an opening extending continuously around the main axis of the engine and the other of which, being the rotor, is rotary and coaxial with and has an abutment or abutments in the cylinder; a member oscillatory coaxially with and having a piston in the cylinder; and means operatively connecting said elements and connected to said member, for oscillating the latter.

In such type of engine the element, or rotor, having the abutment or abutments and the oscillator member having the piston or pistons were each formed as a unit extending from the exterior to the interior of the cylinder through said opening wherefore, obviously, it was impossible to hold the portions of the cylinder immediately both sides of said opening against movement apart as an incident of expansion of the cylinder by the contained heat, wherefore leakage would occur via said opening.

This fault I overcome as follows, stated generally: The stator has an annular portion including, coaxially related to each other, an annular cylinder and an annular channel or race continuously open to each other, and the part of said portion which provides the race is split remote from the cylinder and continuously around the common axis of the cylinder and race and thereby provides margins which may be suitably held together against movement apart. Exterior of and coaxial with the cylinder and race are driven rotor and oscillator elements; arranged in the race, and respectively having an abutment or abutments and a piston or pistons extending into the cylinder, are driving rotor and oscillator elements; and there are rotary transmission members, journaled in the stator on fixed axes, one of which is in tractive engagement with the driving and driven rotor elements and the other in tractive engagement with the driving and driven oscillator elements. In the preferred form the means which binds said margins together binds them in sealing contact with the driving elements, whereby the interior of the cylinder is completely sealed off. Since the invention is applicable to an engine that acts to impel or pump fluid as well as to one that is impelled by fluid I do not wish to be limited to presence of the oscillator.

Two forms of the engine, of the type that is impelled, are shown and described herein, one in which the transmission members have their axes radial of, and the other in which said members have their axes parallel with, the main axis of the engine.

In the drawings,

Fig. 1 is a vertical sectional view showing the first-above indicated form of the engine;

Figures 2, 4:
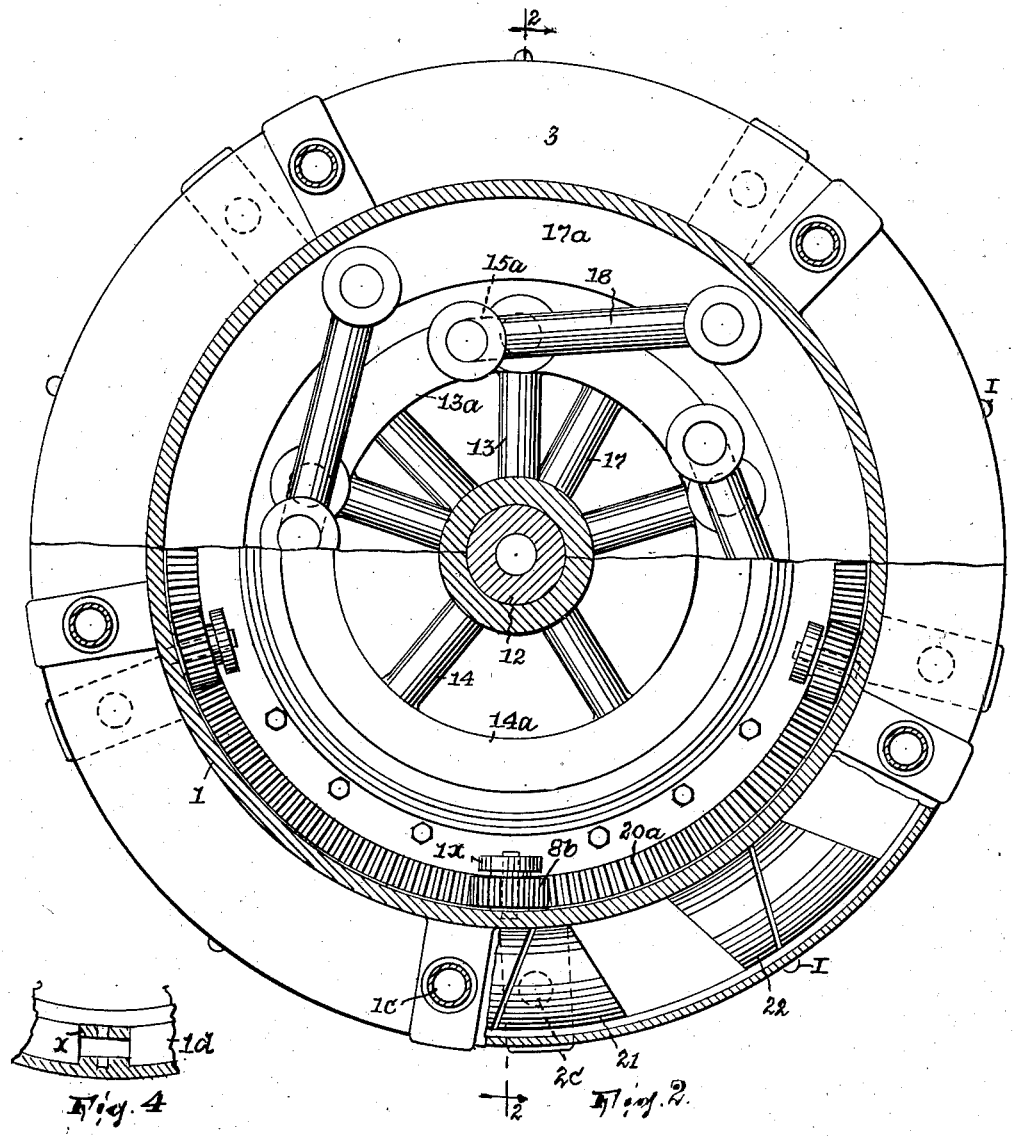
Fig. 2 is a sectional view on line 2—2 of Fig. 1.
Fig. 4 is a fragmentary view of the lower part of the engine in a vertical plane through projection $1x$ and showing the gear $8b$ removed.

*Figs. 1 and 2.*—To provide the stator there are the following parts: Two concave-convex heads 1 and 2 which at their outer perimeters are respectively formed with the halves $1a$ and $2a$ of an annular cylinder, generally denoted 3, divided in a plane bisecting it transversely of the axis around which it is formed annular, such halves of the cylinder having laterally projecting laminated flanges $1b$ and $2b$ by which they may be secured together, as by bolts or rivets (not shown) penetrating said flanges; the cylinder halves respectively have the intake and exhaust ports $1c$ and $2c$. The heads together form a housing providing what I term the working space of the stator and they support ball-bearings 4 coaxial with the cylinder. One head may have a removable cover 5 affording access to said space. The heads have annular flanges $1d$ and $2d$ concentric with and projecting here inwardly from the cylinder, generally L-shaped in section and thereby providing between them the mentioned race 6. The portion of the stator which includes the cylinder and race is treated as continuously split, here inward of the cylinder, thereby providing opposed margins formed by the flanges, which may be secured against movement apart by bolts 7. At equally spaced intervals circumferentially thereof the flanges provide openings $x$, Fig. 4, for the transmission members, as gears $8b$ and $8a$, which thus have their peripheries exposed to the race and the exterior thereof, as shown in Fig. 1, being journaled on studs $8x$ set in projections $2x$ and $1x$ of the flanges and in the heads and extending radially of the main axis of the engine. The openings $x$ are positioned each in a radius between the intake and exhaust ports, or where the pressure and suction in the cylinder are respectively the minimum and the maximum.

In any way made fast to head 2 is contained therein an internally toothed sun-gear 9, spaced from the head by a collar 10.

In the bearings 4 and penetrating the collar and sun gear is journaled the main shaft 12.

Keyed to this shaft are two spiders 13 and 14 forming with the shaft the driven rotor element of a train that includes the driving rotor element and transmission members. The spiders provide bearings 13x and 14x in their rims 13a and 14a, respectively, the bearings of both spiders being equally spaced from the shaft and each other and those of one spider being alined with those of the other. Each two thus-alined bearings receive a shaft 15 having at one end a planet-gear 16 in mesh with the sun-gear and at the other end a crank 15a. As will be apparent, spider 13 is not an indispensable portion of the driven rotor element.

Oscillatory around shaft 12, between spiders 13 and 14, is a spider 17 forming the driven oscillator element of the train that includes the driving oscillator element and transmission members.

The rims 14a and 17a are so formed as first to be diverted and then extend toward the surrounding portions of the stator heads, as shown in Fig. 1, and they are formed to provide gears 14b and 17b facing each other and concentric with shaft 12, being in mesh with gears 8.

Pivoted links 18 connect the cranks 15a of shafts 15 with the flange 17a of spider 17.

At 1 are diagrammatically indicated the igniters.

In the operation of the engine the parts 12—13—14 are rotated as a unit constantly in one direction and the spider 17, while undergoing rotation in the same direction, is also oscillated, as usual in this type of engine. (Of course it is conceivable, as in any engine of this type, that, as between what I herein term the stator and the rotary driven element, the former should rotate and the latter remain stationary.)

In the race 6 are arranged in face to face relation two ring gears 19 and 20 concentric with the main axis of the engine and having continuous series of teeth 19a and 20a, they constituting the mentioned driving rotor and oscillator elements, they respectively having abutments 21 and pistons 22 arranged in the cylinder and preferably, though not necessarily, having the forms shown and described in my Patent No. 2,352,877, dated July 4, 1944.

In so far as the rotary and oscillatory motions of the abutments and pistons are concerned the engine operates the same as in any case of its type in which the rotor and the oscillator, having the abutments and pistons, respectively, are each formed as a unit. Essentially, the change involved in the present invention contemplates forming what was a unit in each case so as to comprise a driving and a driven element, with a rotary transmission member, as 8a and 8b, between them occupying a fixed radial relation to the stator; thereby the mentioned continuous opening or slot by which the unitary rotor and oscillator extended from the exterior to the interior of the cylinder is omitted and it is possible, as by the bolts 7, to bind the aforesaid margins of the stator, continuously of themselves, against movement apart as an incident of expansion of the cylinder, as here in close relation to the closely related driving elements 19 and 20 so that the space of the cylinder is sealed off.

Figure 3:
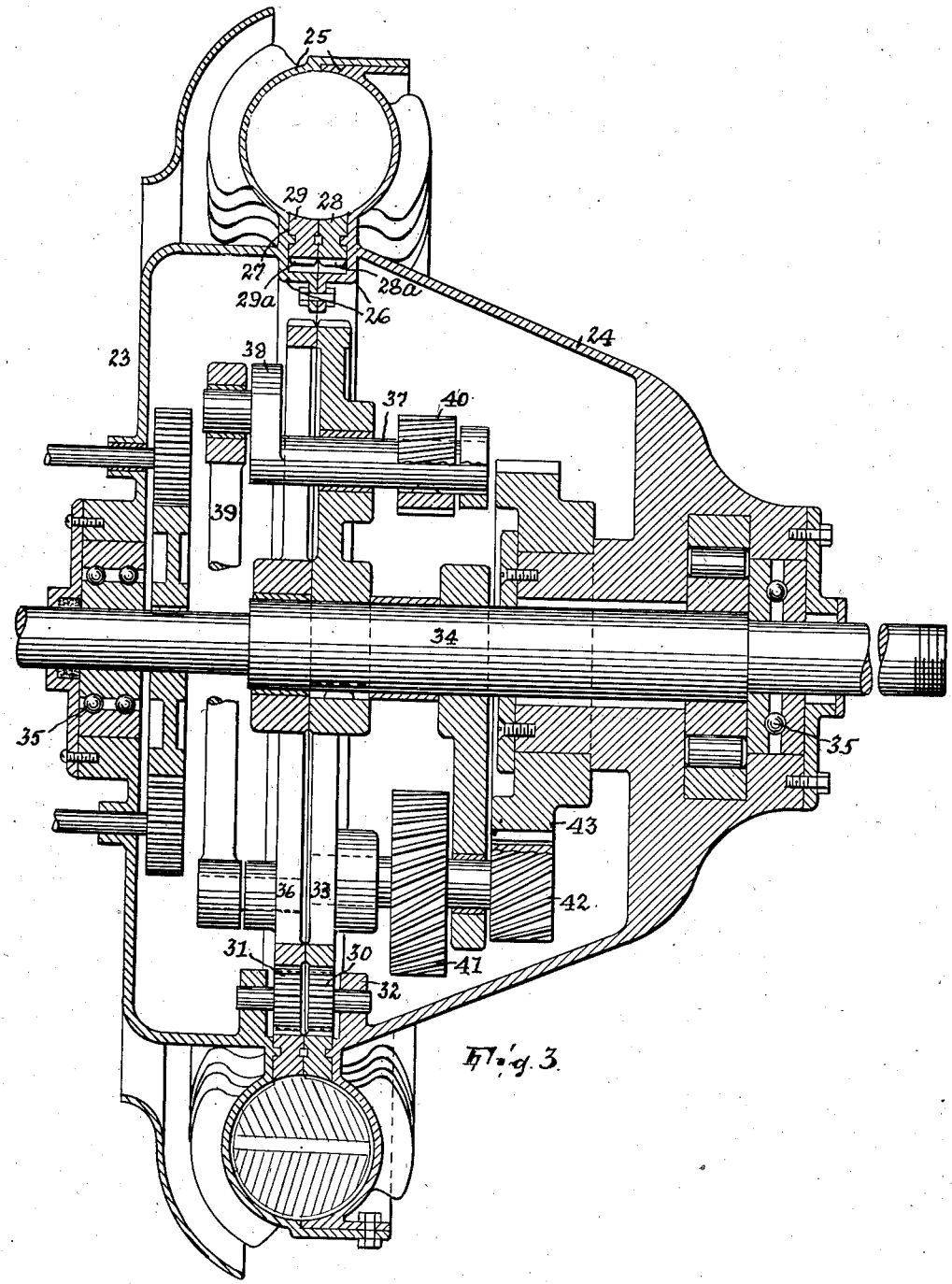
Fig. 3 is a vertical sectional view of the other form of the engine.

Fig. 3.—Here 23 and 24 are the stator heads of sections providing the cylinder halves 25 and the flanges 26 which form the race 27 in which are the driving rotor element 28 and the driving oscillator element 29 of the trains, such elements having in this case teeth 28a and 29a at their inner peripheries. Here the transmission members 30 and 31, in mesh with the driving elements 28 and 29, respectively, are journaled on axes parallel with the main axis of the engine in lugs, as 32, of the stator. The driven rotor element is formed by the spider 33 and the main shaft 34 to which it is keyed and which is journaled at 35 in the stator, the spider rim being continuously toothed, as in the form first described, but peripherally, and in mesh with the element 30. The driven oscillator element is a spider 36 oscillative on the shaft and having its periphery also toothed and in mesh with the transmission element 31. In the spider 33 are journaled shafts such as 37, corresponding to shafts 15, parallel with the main axis and having cranks, as 38 which, through links 39, are connected with the spider 36 substantially the same as in the form first described. Each shaft 37 has a pinion 40 which is driven from a gear, such as 41 (shown at the lower part of Fig. 3) with which it meshes, and which has formed as a unit with it a pinion 42 in mesh with the sun-gear 43 fast to the stator, all substantially the same as in my Patent No. 2,284,186.

I wish it to be understood that in the broad aspect of my invention the following conditions are not indispensable: That there be necessarily present to coact with the rotor means (such as 14—8a—19), oscillator means (such as 17—8b—20); that there be more than one abutment and piston; that in any complete rotation of the rotor means there be more than one cycle of operations comprising intake, compression, explosion and exhaust; or that the split (i. e., between the margins of the stator) be in a plane perpendicular to the main axis of the engine rather than in some other location and consequently that the transmission gear or each such gear have its axis radially instead of otherwise related to the main axis.

Having thus fully described my invention, what I claim is:

1. In combination, a rotary engine stator having an annular portion including, coaxially related to each other, an annular cylinder and an annular race continuously open to each other, the part of said portion which provides the race being split remote from the cylinder and continuously around the common axis of said cylinder and race and thereby providing opposed margins, means to confine said margins against movement apart, a driven rotor element coaxial with and exterior of the cylinder, an annular driving rotor element coaxial with the cylinder and arranged in said race and having an abutment extending into the cylinder, and a rotary transmission member journaled in the stator on a fixed axis and in tractive engagement with the driving and driven elements.

2. The combination set forth in claim 1 characterized by said margins and driven element coacting to seal off substantial flow from the cylinder of the fluid content thereof.

3. In an internal-combustion engine, the combination of a stator having an annular portion including, coaxially related to each other, an annular cylinder and an annular race continuously open to each other, the part of said portion which provides the race being split remote from the cylinder and continuously around the common axis of said cylinder and race and thereby providing opposed margins, means to confine said margins against movement apart, driven rotor and oscillator elements coaxial with and exterior of the cylinder, annular driving rotor and oscillator elements coaxial with the cylinder and arranged in said race and respectively having an abutment and a piston extending into the cylinder, rotary transmission members journaled in the stator on fixed axes and one of which is in tractive engagement with the driving and driven rotor elements and the other in tractive engagement with the driving and driven oscillator elements, and means, operatively connecting the stator and the driven rotor element and operatively connected to the oscillator element, for oscillating the latter.

4. The combination set forth in claim 3 characterized by said margins and the driving elements coacting to seal off substantial flow from the cylinder of the fluid content thereof.

HARRY F. WOLSTENHOLME.